US012651015B2

(12) United States Patent
Ghaemi

(10) Patent No.: US 12,651,015 B2
(45) Date of Patent: Jun. 9, 2026

(54) VECTOR GENERATION AND INDEXING SYSTEM

(71) Applicant: SAP SE, Walldorf (DE)

(72) Inventor: Houman Ghaemi, British Columbia (CA)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/913,784

(22) Filed: Oct. 11, 2024

(65) Prior Publication Data

US 2026/0105093 A1    Apr. 16, 2026

(51) Int. Cl.
*G06F 16/334* (2025.01)

(52) U.S. Cl.
CPC ................................. *G06F 16/3347* (2019.01)

(58) Field of Classification Search
CPC .................................................... G06F 16/3347
USPC ........................................................ 707/741
See application file for complete search history.

(56) References Cited

U.S. PATENT DOCUMENTS

| | | | | |
|---|---|---|---|---|
| 12,222,898 B1 * | 2/2025 | Madan | .................... | G06F 16/148 |
| 12,235,882 B1 * | 2/2025 | Chawla | ................. | G06F 16/285 |
| 2024/0303516 A1 | 9/2024 | Bergonzo et al. | | |
| 2025/0103590 A1 * | 3/2025 | Blyumen | ............ | G06F 16/2282 |
| 2025/0284679 A1 * | 9/2025 | Mishra | ................ | G06F 16/2237 |

FOREIGN PATENT DOCUMENTS

| | | |
|---|---|---|
| CN | 117648405 | 3/2024 |

OTHER PUBLICATIONS

"Embeddings from multiple providers? API—OpenAI Developer Forum", XP093367235, [Online] Retrieved from the internethttps web.archive.org web 20240522092542 https community.openai. com t embeddings-from-multiple-providers 662994, Mar. 2, 2024, 9 pgs.
"European Application Serial No. 25207466.1, Extended European Search Report mailed Mar. 3, 2026", 8 pgs.

* cited by examiner

*Primary Examiner* — Kimberly L Wilson
(74) *Attorney, Agent, or Firm* — SCHWEGMAN LUNDBERG & WOESSNER, P.A.

(57) ABSTRACT

Systems and methods are provided for generating and storing vector embeddings for each set of data of the sets of data in respective table of a plurality of tables and storing, for each table, a model type and version corresponding to a model used to generate the vector embeddings stored in each respective table of the plurality of tables. The systems and methods further generate a response to a query by generating vector embeddings for the query with a same model type and version as the model type and version used to generate vector embeddings for one or more tables with relevant data to the query.

20 Claims, 8 Drawing Sheets

600

RECEIVE A QUERY AND DETERMINE A SUBSET OF TABLES RELEVANT TO THE QUERY
602

DETERMINE A STORED MODEL TYPE AND VERSION ASSOCIATED WITH EACH TABLE OF THE SUBSET OF TABLES
604

GENERATE A VECTOR EMBEDDING FOR THE QUERY USING THE STORED MODEL TYPE AND VERSION
606

GENERATE A SET OF SIMILAR DATA BASED ON THE VECTOR EMBEDDINGS FOR THE QUERY AND VECTOR EMBEDDINGS FOR THE SETS OF DATA STORED IN THE SUBSET OF TABLES
608

100

Figure 2:
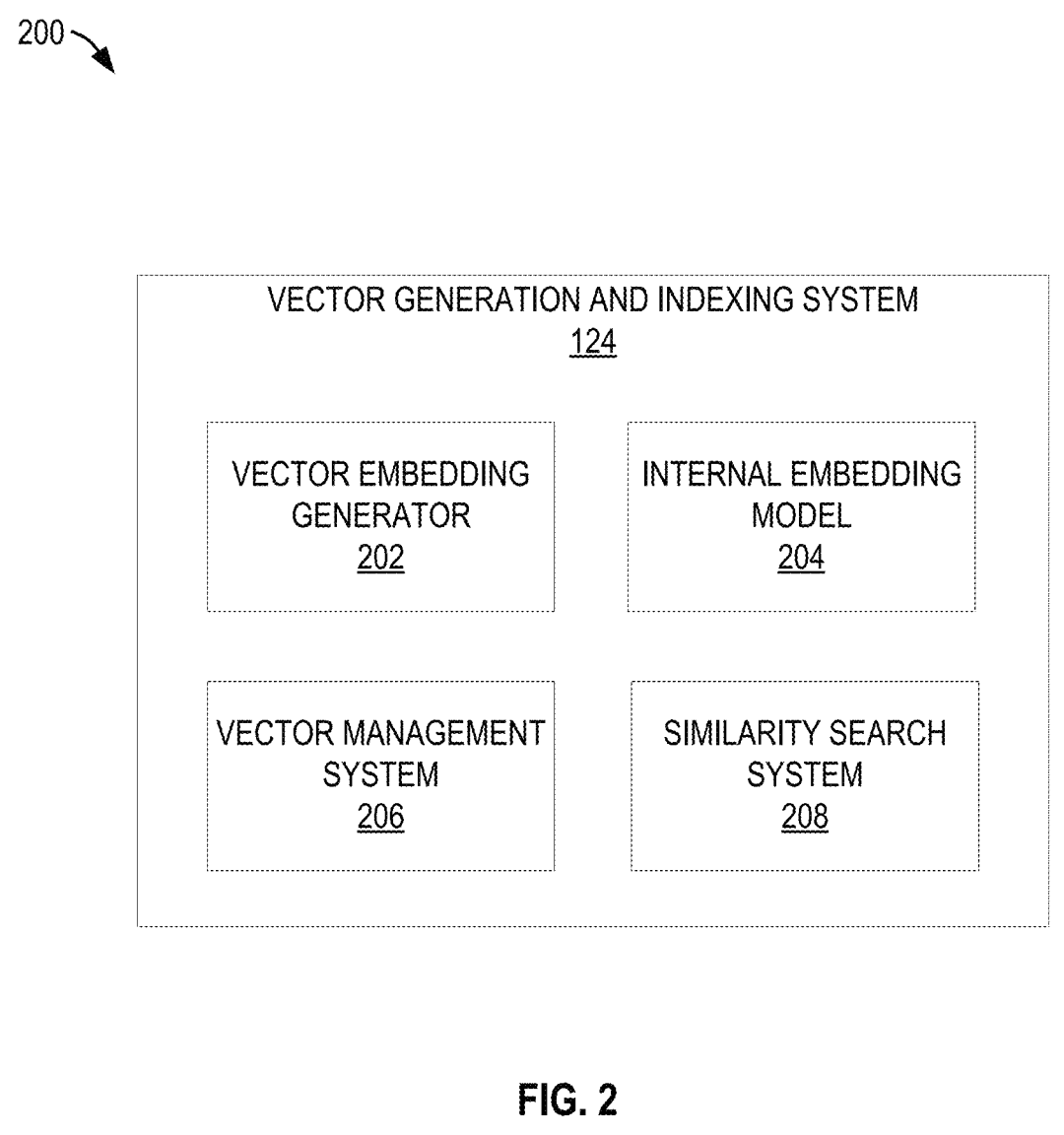

200

VECTOR GENERATION AND INDEXING SYSTEM
124

VECTOR EMBEDDING
GENERATOR
202

INTERNAL EMBEDDING
MODEL
204

VECTOR MANAGEMENT
SYSTEM
206

SIMILARITY SEARCH
SYSTEM
208

GENERATE VECTOR EMBEDDINGS FOR SETS OF DATA
502

STORE THE VECTOR EMBEDDINGS IN RESPECTIVE TABLES
504

STORE, FOR EACH TABLE, A MODEL TYPE AND VERSION
CORRESPONDING TO A MODEL USED TO GENERATE THE
VECTOR EMBEDDINGS
506

600

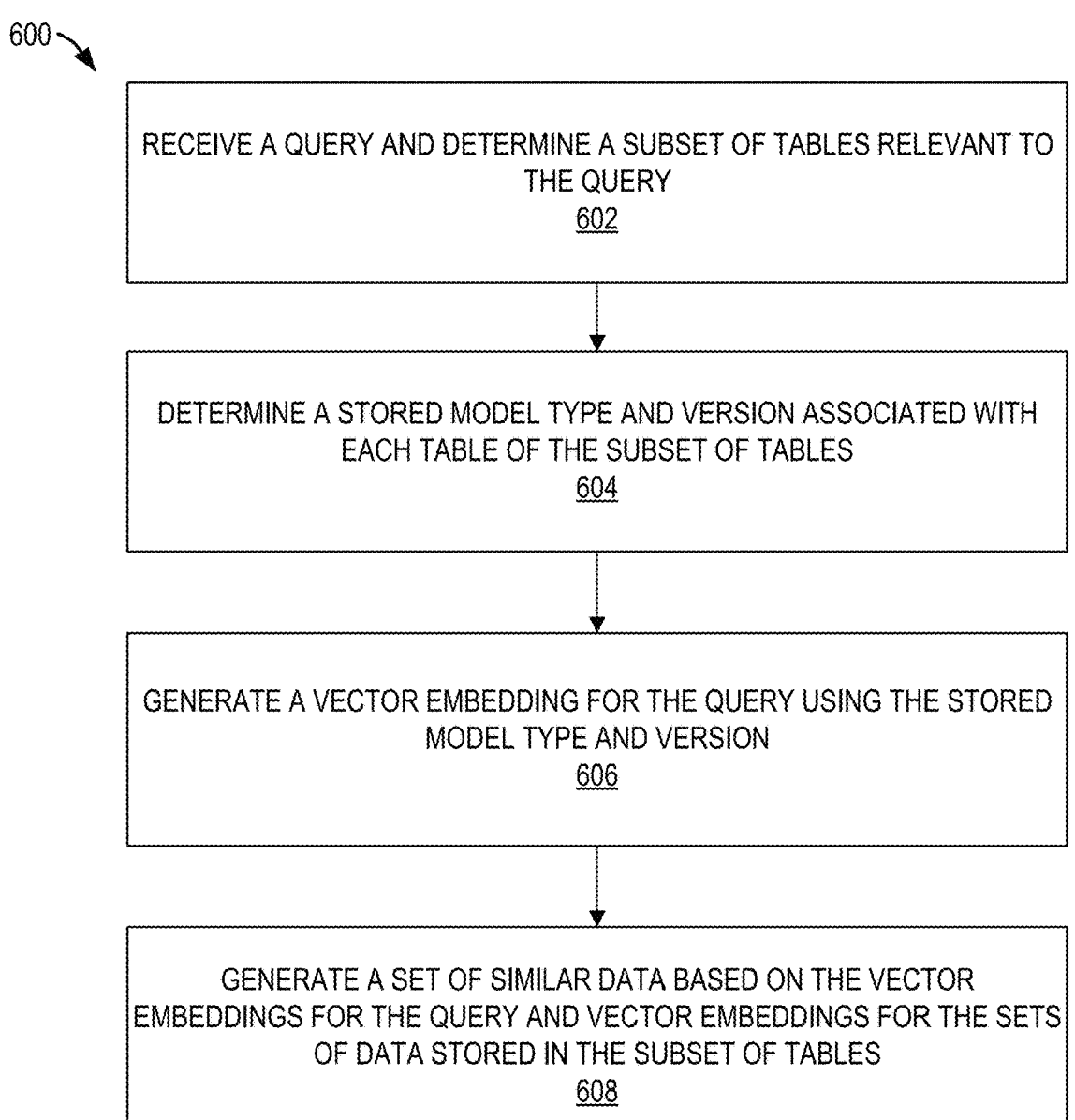

RECEIVE A QUERY AND DETERMINE A SUBSET OF TABLES RELEVANT TO
THE QUERY
602

DETERMINE A STORED MODEL TYPE AND VERSION ASSOCIATED WITH
EACH TABLE OF THE SUBSET OF TABLES
604

GENERATE A VECTOR EMBEDDING FOR THE QUERY USING THE STORED
MODEL TYPE AND VERSION
606

GENERATE A SET OF SIMILAR DATA BASED ON THE VECTOR
EMBEDDINGS FOR THE QUERY AND VECTOR EMBEDDINGS FOR THE SETS
OF DATA STORED IN THE SUBSET OF TABLES
608

VECTOR GENERATION AND INDEXING SYSTEM

BACKGROUND

Many computing systems use or are being updated to use artificial intelligence (AI), such as machine learning models (e.g., LLMs), to convert artifacts, such as text, images, audio, or video, to vectors of high dimensionality. This conversion is called vector embedding as the models embed the semantics of the artifacts in a vector space with a large number of dimensions. For example, in a typical scenario, a LLM can generate vector embeddings with hundreds to thousands of dimensions.

BRIEF DESCRIPTION OF THE DRAWINGS

Various ones of the appended drawings merely illustrate example embodiments of the present disclosure and should not be considered as limiting its scope.

FIG. 2 is a block diagram illustrating a vector generation and indexing system system, according to some examples.

FIG. 5 and FIG. 6 each comprise a flow chart illustrating aspects of a method, according to some examples.

DETAILED DESCRIPTION

Figure 1:
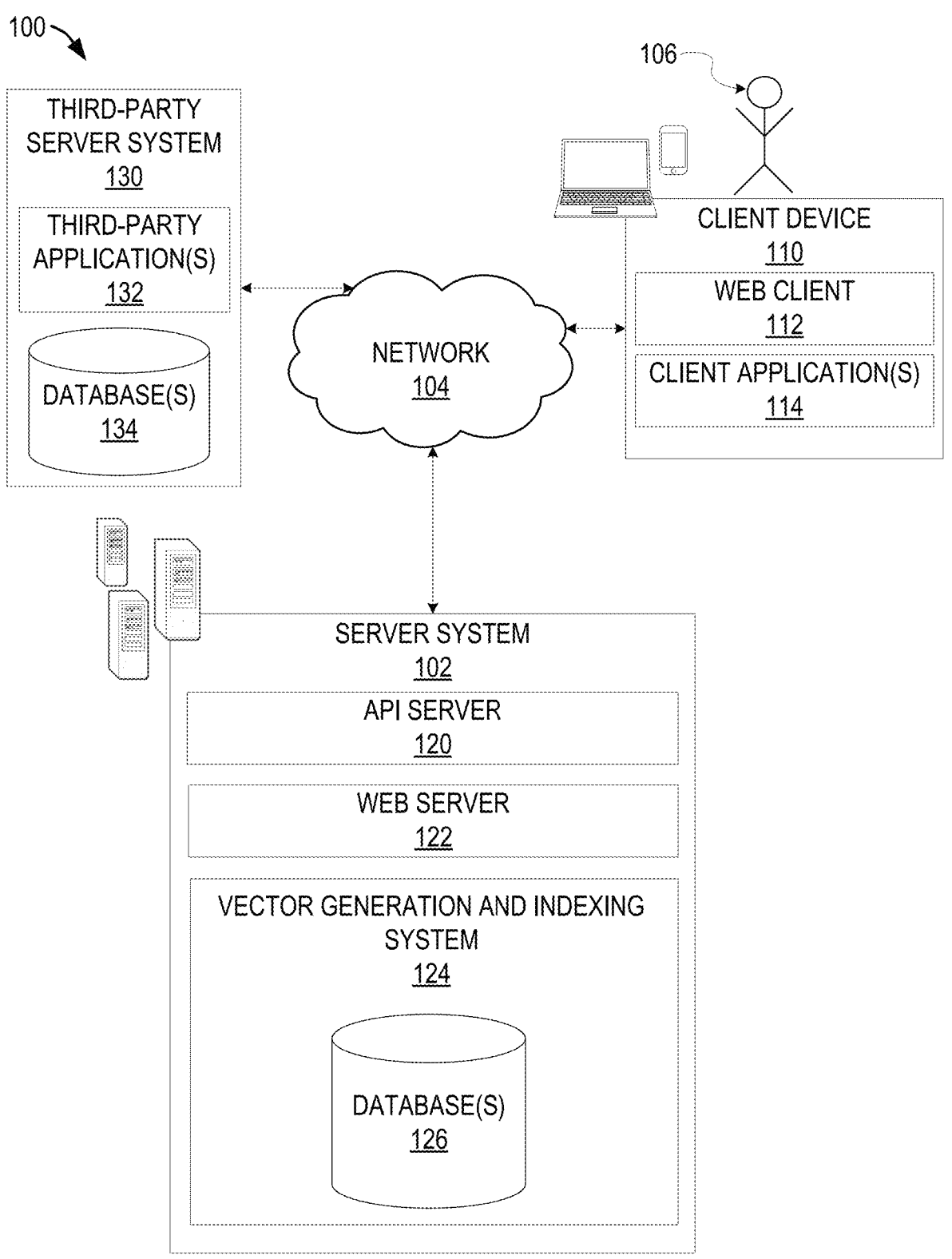
FIG. 1 is a block diagram illustrating a networked system, according to some examples.

As mentioned above, machine learning models (e.g., LLMs), convert artifacts in a system, such as text, images, audio or video, to vectors of high dimensionality. These vectors, also referred to as vector embeddings, are used for, among other things, generating a response to a query by performing a similarity search in the system, such as in a relational database (e.g., SQL database) of a system. The dimensions, or components generated for vector embeddings are model specific. Using a very simple example, an embedding for the word Apple can have dimension values [−2, 34]. These dimension values are totally meaningless on their own and only have usefulness when compared with another embedding generated by the same model. Since the generated vectors are model dependent, they cannot be used with any other model, library or engine. Further, they cannot be used if, and when, the model's parameters change. The components, or dimension values of a vector are opaque, and they cannot be mapped to the original data, and due to this opaqueness, they cannot be transcribed to vectors generated by another model or engine either.

Thus, these vectors must be regenerated with every change of the external model, and their semantics are proprietary to the model used for their generation. This is a major drawback for enterprises using vector data for their search and Generative Artificial Intelligence (Gen AI) workflows. Because the validity of their database become dependent on an external entity and they not only need to keep track of the changes to the external LLMs, but also, they need to regenerate all vector embeddings upon any change to the models. This is not practical for the amount of data in a given system. Further, many systems have tens or hundreds of thousands of tables that store artifacts and vector embeddings. Different models and versions may be used for different tables causing even further complexity and incompatibility.

The results for a search for similar data can be returned for client consumption or they can be used for performing a Retrieval Augmented Generation (RAG) with a machine learning model such as an LLM. In a RAG workflow, similar artifacts are retrieved from a database using their vector embeddings, and they are fed as prompt or context to an external LLM. Without RAG the state-of-the-art LLMs are not useful in an enterprise environment because the LLMs do not have any knowledge of corporate data. Therefore, the search results without RAG are of no use to an enterprise user, in this example.

Examples described herein address at least these technical problems with a datastore-managed (e.g., database-managed) vector generation and indexing system that is transparent to an end user. The implementation details of how vectors are generated and maintained are hidden from the end user and managed automatically by the datastore, such as a database. For example, the vector generation and indexing management system utilizes an LLM or other machine learning model technique to ingest artifacts and then uses techniques described in further detail below to search for the ingested artifacts, in real-time, in response to a query, regardless of the model type or version number of a model type used for vector embeddings. When the vector generation and indexing system receives a query, the vector generation and indexing system vectorizes the query terms using the same model as the one used to create the vectors for the data to be searched. Further, the vector generation and indexing management system can search for ingested artifacts even if they are stored in datastores that each have had vector embeddings generated using different model types and/or different versions of a same model type.

In some examples, the vector generation and indexing management system generates vector embeddings for sets of data to be stored in each of a respective table of a plurality of tables, stores the vector embeddings for each set of data of the sets of data in the respective table of the plurality of tables and stores, for each table, a model type and version corresponding to a model used to generate the vector embeddings stored in each respective table of the plurality of tables. The vector generation and indexing management system further receives a query and determines a subset of tables of the plurality of tables that are relevant to the query, determines a stored model type and version associated with each table of the subset of tables. In some examples, there are at least two different model types or versions for the subset of tables. The vector generation and indexing management system generates a vector embedding for the query using the stored model type and version for each of the at least two different model types or versions for the subset of tables and generates a set of similar data based on the vector embeddings for the query and the vector embeddings for the sets of data stored in the subset of tables. The vector generation and indexing management system can further generate a response to the query based on the set of similar data.

FIG. 1 is a block diagram illustrating a networked system 100, according to some example embodiments. The system 100 can include one or more client devices such as client device 110. The client device 110 can comprise, but is not limited to, a mobile phone, desktop computer, laptop, portable digital assistant (PDA), smart phone, tablet, ultrabook, netbook, laptop, multi-processor system, microprocessor-based or programmable consumer electronic, game console, set-top box, computer in a vehicle, wearable computing device, or any other computing or communication device that a user may utilize to access the networked system 100. In some embodiments, the client device 110 comprises a display module (not shown) to display information (e.g., in the form of user interfaces). In further embodiments, the client device 110 can comprise one or more of touch screens, accelerometers, gyroscopes, cameras, microphones, global positioning system (GPS) devices, and so forth. The client device 110 can be a device of a user 106 that is used to access and utilize cloud services, utilize a vector generation and indexing system 124, among other applications.

One or more users 106 may be a person, a machine, or other means of interacting with the client device 110. In example embodiments, the user 106 may not be part of the system 100 but may interact with the system 100 via the client device 110 or other means. For instance, the user 106 can provide input (e.g., touch screen input or alphanumeric input) to the client device 110 and the input can be communicated to other entities in the system 100 (e.g., third-party server system 130, server system 102) via a network 104. In this instance, the other entities in the system 100, in response to receiving the input from the user 106, communicate information to the client device 110 via the network 104 to be presented to the user 106. In this way, the user 106 can interact with the various entities in the system 100 using the client device 110.

The system 100 further includes a network 104. One or more portions of network 104 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 can access the various data and applications provided by other entities in the system 100 via web client 112 (e.g., a browser, such as the Internet Explorer® browser developed by Microsoft® Corporation of Redmond, Washington State) or one or more client applications 114. The client device 110 can include one or more client applications 114 (also referred to as "apps") such as, but not limited to, a web browser, a search engine, a messaging application, an electronic mail (email) application, an e-commerce site application, a mapping or location application, an enterprise resource planning (ERP) application, a customer relationship management (CRM) application, an application for pushing a commit to update code in a project, an application for accessing and utilizing a vector generation and indexing system 124, and the like.

In some embodiments, one or more client applications 114 are included in a given client device 110, and configured to locally provide the user interface and at least some of the functionalities, with the client application(s) 114 configured to communicate with other entities in the system 100 (e.g., third-party server system 130, server system 102, etc.), on an as-needed basis, for data and/or processing capabilities not locally available (e.g., access location information, access machine learning models, to authenticate a user 106, to verify a method of payment, access a vector generation and indexing system 124, and so forth), and so forth. Conversely, one or more client applications 114 may not be included in the client device 110, and then the client device 110 can use its web browser to access the one or more applications hosted on other entities in the system 100 (e.g., third-party server system 130, server system 102).

A server system 102 provides server-side functionality via the network 104 (e.g., the Internet or wide area network (WAN)) to one or more third-party server system 130 and/or one or more client devices 110. The server system 102 can include an application program interface (API) server 120, a web server 122, and vector generation and indexing system 124 that can be communicatively coupled with one or more databases 126.

The one or more databases 126 comprise storage devices that store data related to users of the system 100, applications associated with the system 100, cloud services, machine learning models, data related to entities/products/services, and so forth. The one or more databases 126 can further store information related to third-party server system 130, third-party applications 132, third-party database(s) 134, client devices 110, client applications 114, users 106, and so forth. In one example, the one or more databases 126 is cloud-based storage. In some examples, the database is a relational database, such as a type of Structured Query Language (SQL) database, that is also capable of storing and managing vector embeddings along with the main data that is stored in the database tables, as explained in further detail below.

The server system 102 can be a cloud computing environment, according to some example embodiments. The server system 102, and any servers associated with the server system 102, can be associated with a cloud-based application, in one example embodiment.

The vector generation and indexing system 124 provides back-end support for third-party applications 132 and client applications 114, which can include cloud-based applications. The vector generation and indexing system 124 provides for vector generation and indexing, among other functions as described in further detail below. The vector generation and indexing system 124 can comprise one or more servers or other computing devices or systems. In some examples, the vector generation and indexing system 124 is part of a database system.

The system 100 further includes one or more third-party server system 130. The one or more third-party server system 130 can include one or more third-party application(s). The one or more third-party application(s) 132, executing on third-party server(s) 130, can interact with the server system 102 via API server 120 via a programmatic interface provided by the API server 120. For example, one or more of the third-party applications 132 can request and utilize information from the server system 102 via the API server 120 to support one or more features or functions on a website hosted by the third party or an application hosted by the third party.

The third-party website or application 132, for example, can provide access to functionality and data supported by third-party server system 130. In one example embodiment, the third-party website or application 132 provides access to functionality that is supported by relevant functionality and data in the third-party server system 130. In another example, a third-party server system 130 is a system associated with an entity that accesses cloud services via server system 102.

The third-party database(s) 134 can be storage devices that store data related to users of the third-party server system 130, applications associated with the third-party server system 130, cloud services, machine learning models, parameters, and so forth. The one or more databases 126 can further store information related to third-party applications 132, client devices 110, client applications 114, users 106, and so forth. In one example, the one or more databases 134 are cloud-based storage.

FIG. 2 is an example block diagram 200 showing further detail of the vector generation and indexing system 124. In the examiner block diagram of FIG. 2, the vector generation and indexing system 124 comprises a vector embedding generator 202, an internal embedding model 204, a vector management system 206 and a similarity search system 208. It is to be understood that the vector generation and indexing system 124 can comprise less, different, or additional components or that some components can be combined in examples described herein.

The vector embedding generator 202 converts artifacts into vector embeddings, such as by using an internal embedding model 204 and/or an external embedding model (not shown). As mentioned above, artifacts can include text, images, audio and video or other content. The vector embedding generator 202 further converts a query into a vector embedding, such as by using the internal embedding model 204 and/or an external embedding model (not shown). Some examples of an internal embedding model 204 or an external embedding model include Apache Lucene, ChatGPT, Gemini, and the like. The similarity search system 208 compares the query vector embedding to vector embeddings for artifacts to generate result artifacts that are relevant to a query. The vector management system 206 manages model type and versions for the vector embeddings, as explained in further detail below.

Figure 3:
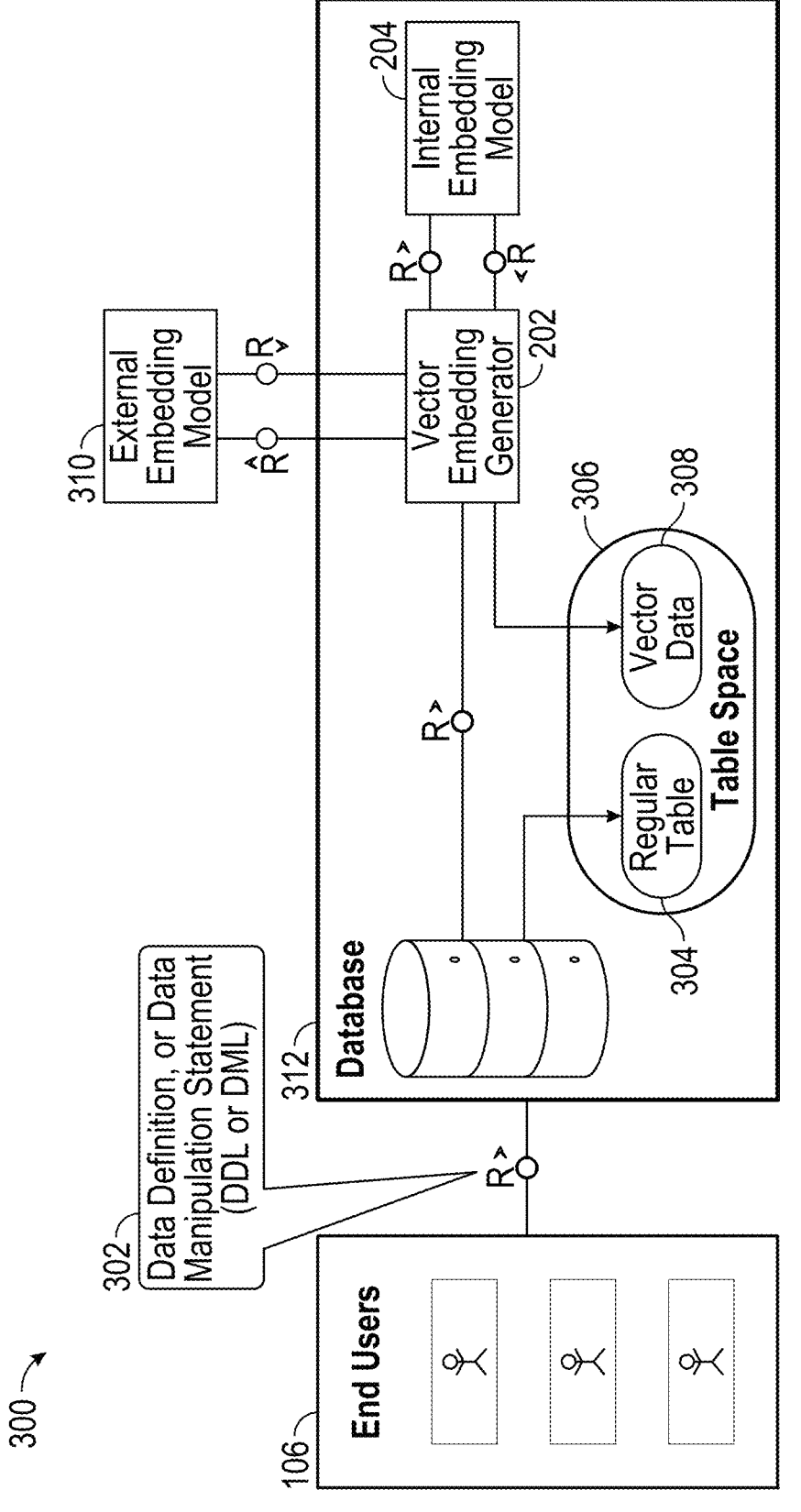
FIG. 3 is a diagram illustrating vector embedding generation and indexing performed by a vector embedding generation and indexing system, according to some examples.

FIG. 3 is a diagram 300 illustrating vector embedding generation and indexing performed by the vector embedding generation and indexing system 124 that can be coupled with or be part of the database 312 (or other datastore) shown in FIG. 3. A database 312 is used as an example datastore in FIG. 3. It is to be understood that other datastores (e.g., JSON) can be used in examples described herein.

End users 106 can create a table 304, for example, via a data definition (DDL) or data manipulation (DML) statement as shown in refence number 302. When the table 304 is created, a vector index is also automatically created for the table 304. The vector index is a hidden vector column that keeps vector data for a desired column. In FIG. 3, vector data 308 is shown in the same table space 306 as the table 304.

Artifacts, such as text, images, audio, and video, are inserted into the database either as a whole or in chunks. These artifacts can be used for producing vector embeddings. When the database 312 receives a new piece of data (e.g., artifact), the database 312 is responsible for generating vector embeddings for this newly created record and keeping a reference to the newly created data record. Other operations may be performed, such as updating other indices, not discussed here.

The vector embedding generator 202 can use either an internal embedding model 204 in the database and/or an external embedding model 310 to generate vector embeddings of the artifacts. Embedding model selection is a configuration that can be applied to the entire database, or it can be applied to a specific schema, table, or even overridden at table creation time. Any selection method can be used in examples described herein, however, the same model needs to be used as query time as the one used for generating vector embeddings because vector embeddings generated by different models are not compatible with each other. Accordingly, the model type and model version that are used to generate vector embeddings are associated with each artifact, as explained in further detail below. The vector embeddings are stored as vector data 308.

Figure 4:
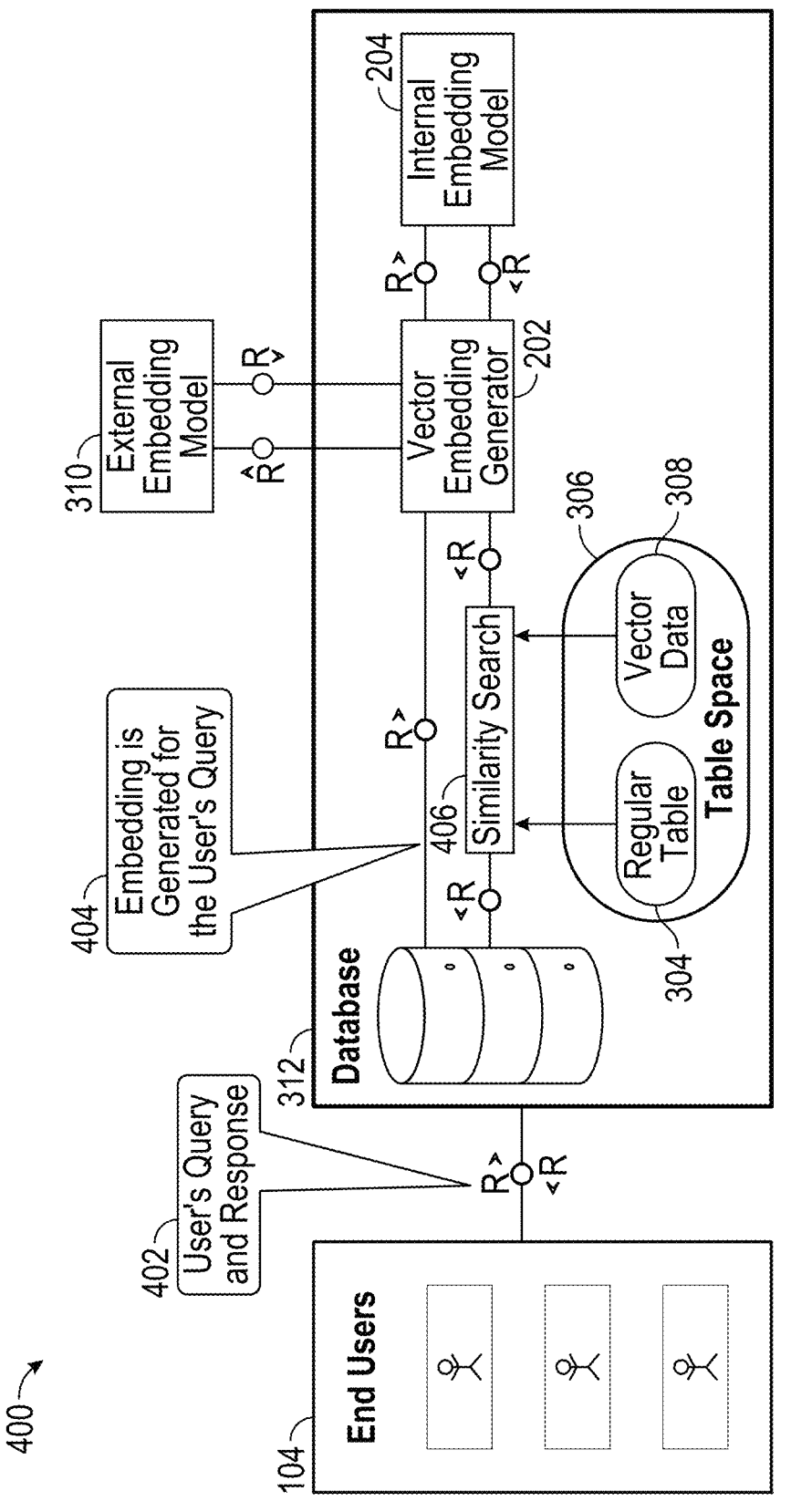
FIG. 4 is a diagram illustrating query receipt and query processing performed by the vector embedding generation and indexing system, according to some examples.

FIG. 4 is a diagram 400 illustrating query receipt and query processing performed by the vector embedding generation and indexing system 124 that comprises additional components to FIG. 3 to illustrate this process. In FIG. 4, end users 106 can submit queries 402 to the database 312. The database 312 receives each query and converts the query to a vector embedding in 404. The database 312 compares the user's query with the existing artifacts in one or more tables by performing a vector similarity search 406. The similarity search is done by comparing the vector embedding for the query and vector data 308 to determine similar data. The vector similarity can be performed behind the scenes because the database creates an embedding for every record (artifact) inserted into the table, as explained above. The database 312 returns all rows, or in some examples a subset (e.g., top N) rows), of the similarity search. A response is generated based on the similar data (e.g., rows or subset of rows) and sent 402 to the end user 106 that submitted the query, as described in further detail below.

Since vector embeddings are implemented and maintained by the database 312, an end user does not need to know about vector generation or maintaining vector generation. Further, as also described in further detail next, the database 312 tracks the embedding model and the version of the embedding model for generating vector embeddings in the database 312. The model versioning and management is important because generative AI models update often, and vector embeddings generated by each version of the model are not compatible with other versions of the same model, as explained above. Generally speaking, vector embeddings are opaque which means that semantic of their components are not known and thus they are not convertible to other formats generated by other models, or other versions of the same model.

Figure 5:
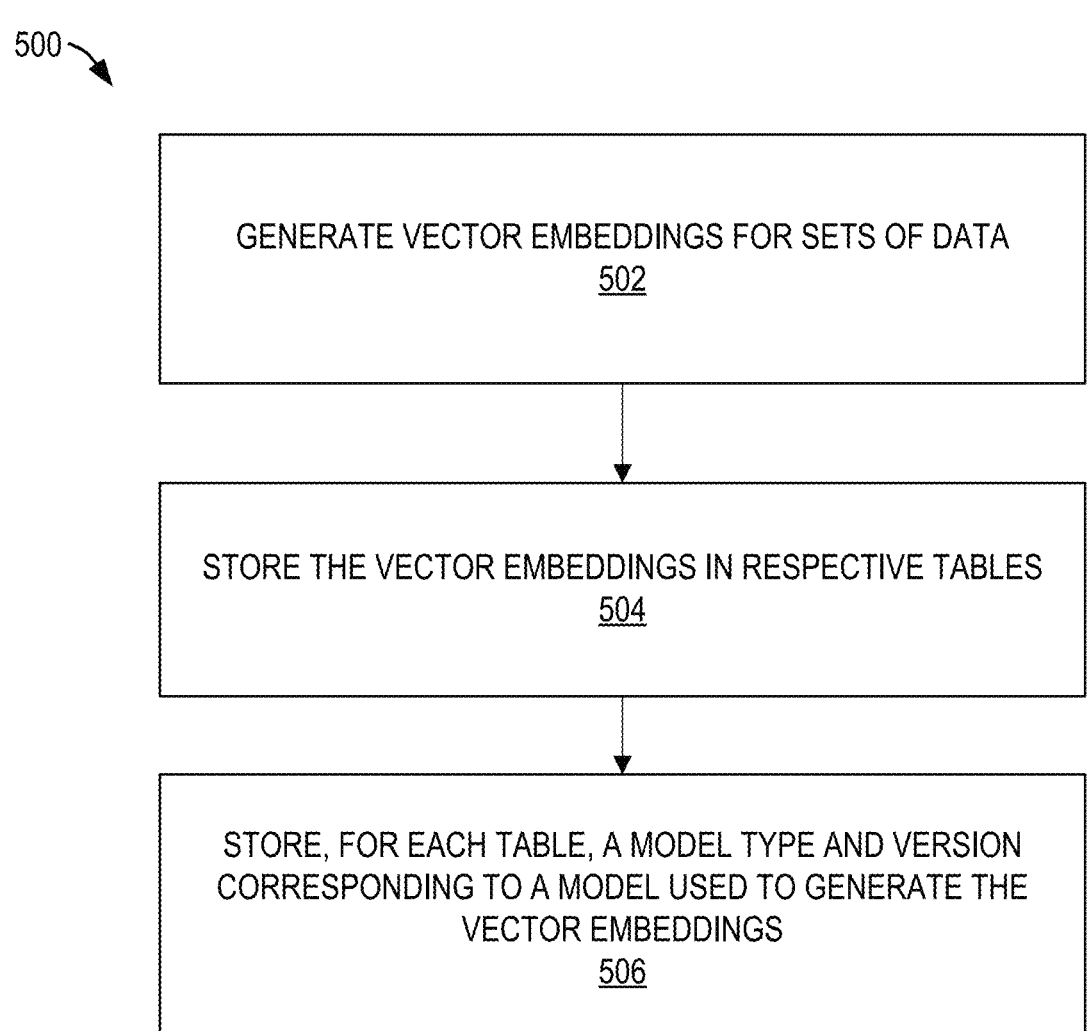

FIG. 5 is a flow chart illustrating aspects of a method 500, for vector embedding generation and indexing, according to some example embodiments. For illustrative purposes, method 500 is described with respect to the block diagrams of FIGS. 1-4. It is to be understood that method 500 can be practiced with other system configurations in other embodiments.

In operation 502, a computing system, such as the server system 102 or vector generation and indexing system 124, generates vector embeddings for sets of data to be stored in each of a respective table of a plurality of data tables. In some examples, as least two different model types or two different versions of a model type are used to generate vector embeddings. A data or document collection in the form of a table in a database is used in the examples described herein. It is to be understood that any data or document collection can be used in examples described herein.

In some examples, the computing system detects artifacts, also referred to herein as data, that are inserted into a database. Different artifacts may be associated with different data collections, such as tables, such that the artifacts are each associated with a respective table and a set of artifacts are stored in a respective table. Thus, for each table of the plurality of tables the computing system performs the operations shown in FIG. 5.

As explained above, before or after generating vector embeddings for sets of data to be stored in each of a respective table of the plurality of tables, the computing system generates a vector index for each table of the plurality of tables. The computing system generates vector embeddings for sets of data by converting each piece of data of each set of data to a vector space with a given number of dimensions.

For example, the computing system generates a vector embedding for each artifact via an internal embedding model 204 or external embedding model 310, such as via the vector embedding generator 202. The computing system stores the vector embedding for each artifact in a respective table. In this way, each vector embedding for each set of data of the sets of data are stored in the respective table of the plurality of tables, in operation 504.

As an example, consider the table below that contains a simple example of data with the words Apple and House. The table has a column with the data and a column that contains the vector embedding (v_data) for the data. For example, for the artifact "Apple" the vector embedding is [−2, 34]. As mentioned above, this is just a simple example for illustration purposes. In a typical real-world example, the artifact or data would comprise text, images, audio, and/or video and have hundreds to thousands of dimensions. In some examples, v_data can be a datatype such as REAL_VECTOR in a HANA database with a large range of dimensions (e.g., from 1 to 65,000).

As also noted above, the column v_data is internal and hidden from an end user's view. This type of internal/hidden column can also be referred to as a shadow column for the vector data. The content of the v_data column are the vector embeddings generated by the internal or external embedding model.

| Data | _v_data |
|---|---|
| Apple | [−2, 34] |
| House | [10, −500] |

In operation 506, the computing system stores, for each table, a model type and version corresponding to a model used to generate the vector embeddings stored in each respective table of the plurality of tables. In one example, the model type and version are stored in another system table in the database 312. For instance, the example table below in an internal table for storing tables to embedding models mapping. The below table will be referred to as v_mappings. The v_mappings table contains mappings between tables that contain vector embeddings (e.g., word_table and another_table) and their respective embedding models (e.g., 1 and 2). For instance, the word_table is mapped to model_id 1.

| schema_name | table_name | model_id |
|---|---|---|
| samples | word_table | 1 |
| samples | another_table | 2 |

In some examples, during insertion of a row in a table that contains vector embeddings, such as word_table shown above, first the computing system performs a lookup on the v_mappings table/view to obtain the ID of the embedding model that should be used to create the vector embeddings. Then, using that model, the embeddings are generated and inserted in the hidden column v_data.

The table below, which will be referred to as v_embeddings table, contains embedding models' metadata. Using this example, the model_id column shown in the v_mappings table shown above is a foreign key into the v_embeddings model.Id column. The v_embeddings table includes fields related to the models that generate vector embeddings, such as version and number of vector dimensions they generate. In some examples, the number of dimensions is stored to be used in certain types of search methods that use the number of dimensions to do a similarity search, such a cosine search. This table may include more columns to store other attributes about embedding models, such as API end points URLs, and so forth, or have different column types in some examples.

| Id | model_name | version | dimensions |
|---|---|---|---|
| 1 | Internal_2D_test_1.0 | 0x10 | 2 |
| 2 | Internal_2D_test1.1 | 0x11 | 2 |
| 3 | OpenAI_text_embedding | 0x04 | 1053 |

The vector column shown in the word_table can have an index for faster similarity search, and the other data columns show in the table can also have an index for faster similarity search. Storing and managing ancillary indices are done via established database techniques and the details of such indices are not shown here.

The computing system can re-vectorize the Data column of word_table and update the v_data column using a database internal API or tools that allow changing the model or changing the version of the model. This operation would not change the Data column but instead would change the internal v_data column shown in the word_table above.

FIG. 6 is a flow chart illustrating aspects of a method 600, for processing queries using the vector generation and indexing described above with respect to FIG. 6, according to some example embodiments. For illustrative purposes, method 600 is described with respect to the block diagram of FIG. 1, FIG. 2 and FIG. 4. It is to be understood that method 600 can be practiced with other system configurations in other embodiments.

In operation 602, a computing system, such as the server system 102 or vector generation and indexing system 124, receives a query and determines a subset of tables of the plurality of tables that are relevant to the query. The computing system generates, in real time or near real time, relevant data for a response to the query. For example, the computing system receives a user query from a client device 110. The computing device determines one or more tables, such as tables, that have data relevant to the received user query. Using a simple example, the computing system can determine that two different tables comprise data relevant to the query. It is to be understood that any number of tables can have data relevant to a query.

In operation 604, the computing system determines a stored model type and version associated with each table of the subset of tables. In some examples, there are at least two different model types or versions for the subset of tables. For example, the computing system performs a look up on a vector mappings table (such as the example v_mappings table described above) to determine what model type is associated with a first table and what model type is associated with a second table, and so forth. The computing system can further perform a lookup on a vector embeddings table (such as the example v_embeddings table described above) to determine a model name, version and other information associated with each of the model type associated with each table. In other examples, only one table is used to determine both the model type and version for each the table.

In operation 606, the computing system generates a vector embedding for the query using the stored model type and version associated with each table. In some examples the computing system generates a vector embedding for the query for each of the at least two different model types or versions for the subset of tables. For example, the query is input into a machine learning model (e.g., LLM) corresponding to a first stored model type and version and the machine learning model outputs vector embeddings for the query, the query is input into a machine learning model (e.g., LLM) corresponding to a second stored model type and version (or the first stored model type and a second version) and the machine learning model outputs vector embeddings for the query, and so forth. In this way, the vector embeddings for the query and the vectors embeddings for a set of data stored in a respective table are compatible since the vector embeddings for the query are done using the same model type and version as the vector embeddings done for the set of data in a respective table.

In operation 608, the computing system generates a set of similar data based on the vector embeddings for the query and the vector embeddings for the sets of data stored in the subset of tables. For example, the computing system compares vector embeddings of the query and the vector embeddings for the set of data stored in each table using a function that can compare two vectors for similarity, such as cosine similarity, Euclidean similarity, L2 distance, Manhattan distance or other technique to determine what data in the set of stored data is similar to the query. In some examples, the computing system determines the top N data that is most similar to the query.

As mentioned above, in some examples there are at least two different model types or versions for the subset of tables and thus, at least two different model types and version are used to generate the vector embeddings for the query, as also explained above. The computing system compares vector embeddings for the query and vector embedding in each corresponding table to generate the set of similarity data. For instance, the computing system compares vector embeddings for the query using a first model type and version with vector embeddings for tables also done with the first model type and version, and the computing system compares vector embeddings using a second model type and version (or the first model type and second version) with vector embeddings for tables also done with the second model type and version (or the first model type and second version) and so forth for each different vector embedding for the query. In this way, the vector embeddings for the query and the vectors embeddings for the set of data stored in the second table are compatible for comparing for similarity.

The computing system generates a response to the query based on the set of similar data. For example, the computing system provides the set of similar data and the query to a machine learning model (e.g., an LLM) to generate a response to the query. The set of similar data is input into the machine learning model and the machine learning model analyzes the input data to generate an appropriate response to the query.

When a new model type or a new version of a model type is used to generate vector embeddings, the computing system automatically re-generates vector embeddings and updates the table to capture the model type and version of the re-generated (or new) data. As an example, the vector embeddings for a set of data stored in a first table were generated using a first model type and a first version. When a new version of the first model type is provided, the computing system re-generates (e.g., generates new vector embeddings) vector embeddings for the set of data stored in the first table using the first model type and a second version. The computing system stores the re-generated vector embedding in the first table and updates for the first table, the version corresponding to the first model type used to re-generate the vector embeddings for the set of data stored in the first table. Thus, when the computing system receives a second query corresponding to the first table, the computing system determines that the first model type and second version associated with the first table, generates a vector embeddings for the second query using the first model type and second version associated with the first table, determines a set of similar data in the first table based on the vector embeddings of the query and the vector embeddings for the sets of data stored in the first table, and generates a response to the second query based on the set of similar data, as explained above.

In view of the above disclosure, various examples are set forth below. It should be noted that one or more features of an example, taken in isolation or combination, should be considered within the disclosure of this application.

Example 1. A computer-implemented method comprising:
    generating vector embeddings for sets of data to be stored in each of a respective table of a plurality of tables;
    storing the vector embeddings for each set of data of the sets of data in the respective table of the plurality of tables;
    storing, for each table, a model type and version corresponding to a model used to generate the vector embeddings stored in each respective table of the plurality of tables;
    receiving a query and determining a subset of tables of the plurality of tables that are relevant to the query;
    determining a stored model type and version associated with each table of a subset of tables relevant to the query, wherein there are at least two different model types or versions for the subset of tables;
    generating a vector embedding for the query using the stored model type and version for each of the at least two different model types or versions for the subset of tables;
    generating a set of similar data based on the vector embeddings for the query and the vector embeddings for the sets of data stored in the subset of tables; and
    generating a response to the query based on the set of similar data.

Example 2. A computer-implemented method according to any of the previous examples, wherein after generating vector embeddings for sets of data to be stored in each of a respective table of the plurality of tables, the method comprises:
    generating a vector index for each table of the plurality of tables.

Example 3. A computer-implemented method according to any of the previous examples, wherein generating the set of similar data based on the vector embeddings for the query and the vector embeddings for the sets of data stored in the subset of tables comprises using a function that can compare two vectors for similarity and utilize the vector index to compare the two vectors.

Example 4. A computer-implemented method according to any of the previous examples, wherein at least two different model types are used to generate vector embeddings.

Example 5. A computer-implemented method according to any of the previous examples, wherein at least two different versions of a model type are used to generate vector embeddings.

Example 6. A computer-implemented method according to any of the previous examples, wherein generating vector embeddings for sets of data comprises converting each piece of data of each set of data to a vector space with a given number of dimensions.

Example 7. A computer-implemented method according to any of the previous examples, wherein the set of similar data is determined based on at least on a comparison of a first vector embeddings of the query and the vector embeddings for the sets of data stored in a first table and a comparison of a second vector embeddings of the query and vector embeddings for the sets of data stored in a second table.

Example 8. A computer-implemented method according to any of the previous examples, wherein the comparison is made using a function that can compare two vectors for similarity.

Example 9. A computer-implemented method according to any of the previous examples, wherein the vector embeddings for a set of data stored in a first table were generated using a first model type and a first version, and further comprising:

re-generating vector embeddings for the set of data stored in the first table using the first model type and a second version;

storing the re-generated vector embeddings in the first table; and updating, for the first table, the version corresponding to the first model type used to re-generate the vector embeddings for the set of data stored in the first table.

Example 10. A computer-implemented method according to any of the previous examples, further comprising:

receiving a second query corresponding to the first table;

determining the first model type and second version associated with the first table;

generating a vector embeddings for the second query using the first model type and second version associated with the first table;

determining a second set of similar data in the first table based on the vector embeddings of the second query and the vector embeddings for the sets of data stored in the first table; and generating a response to the second query based on the second set of similar data.

Example 11. A computer-implemented method according to any of the previous examples, wherein data comprises text, an image, audio, or video.

Example 12. A system comprising:

a memory that stores instructions; and one or more processors configured by the instructions to perform operations comprising:

generating vector embeddings for sets of data to be stored in each of a respective table of a plurality of tables;

storing the vector embeddings for each set of data of the sets of data in the respective table of the plurality of tables;

storing, for each table, a model type and version corresponding to a model used to generate the vector embeddings stored in each respective table of the plurality of tables;

receiving a query;

determining a stored model type and version associated with each table of a subset of tables relevant to the query, wherein there are at least two different model types or versions for the subset of tables;

generating a vector embedding for the query using the stored model type and version for each of the at least two different model types or versions for the subset of tables;

generating a set of similar data based on the vector embeddings for the query and the vector embeddings for the sets of data stored in the subset of tables; and generating a response to the query based on the set of similar data.

Example 13. A system according to any of the previous examples, wherein after generating vector embeddings for sets of data to be stored in each of a respective table of the plurality of tables, the operations:

generating a vector index for each table of the plurality of tables.

Example 14. A system according to any of the previous examples, wherein at least two different model types are used to generate vector embeddings or wherein at least two different versions of a model type are used to generate vector embeddings.

Example 15. A system according to any of the previous examples, wherein generating vector embeddings for sets of data comprises converting each piece of data of each set of data to a vector space with a given number of dimensions.

Example 16. A system according to any of the previous examples, wherein the set of similar data is determined based on at least on a comparison of a first vector embeddings of the query and the vector embeddings for the sets of data stored in a first table and a comparison of a second vector embeddings of the query and vector embeddings for the sets of data stored in a second table.

Example 17. A system according to any of the previous examples, wherein the comparison is made using a function that can compare two vectors for similarity.

Example 18. A system according to any of the previous examples, wherein the vector embeddings for a set of data stored in a first table were generated using a first model type and a first version, and the operations further comprising:

re-generating vector embeddings for the set of data stored in the first table using the first model type and a second version;

storing the re-generated vector embeddings in the first table; and updating, for the first table, the version corresponding to the first model type used to re-generate the vector embeddings for the set of data stored in the first table.

Example 19. A system according to any of the previous examples, the operations further comprising:

receiving a second query corresponding to the first table;

determining the first model type and second version associated with the first table;

generating a vector embeddings for the second query using the first model type and second version associated with the first table;

determining a second set of similar data in the first table based on the vector embeddings of the second query and the vector embeddings for the sets of data stored in the first table; and generating a response to the second query based on the second set of similar data.

Example 20. A non-transitory computer-readable medium comprising instructions stored thereon that are executable by at least one processor to cause a computing device to perform operations comprising:

generating vector embeddings for sets of data to be stored in each of a respective table of a plurality of tables;

storing the vector embeddings for each set of data of the sets of data in the respective table of the plurality of tables;

storing, for each table, a model type and version corresponding to a model used to generate the vector embeddings stored in each respective table of the plurality of tables;

receiving a query;

determining a stored model type and version associated with each table of a subset of tables relevant to the query, wherein there are at least two different model types or versions for the subset of tables;

generating a vector embedding for the query using the stored model type and version for each of the at least two different model types or versions for the subset of tables;

generating a set of similar data based on the vector embeddings for the query and the vector embeddings for the sets of data stored in the subset of tables; and generating a response to the query based on the set of similar data.

Figure 7:
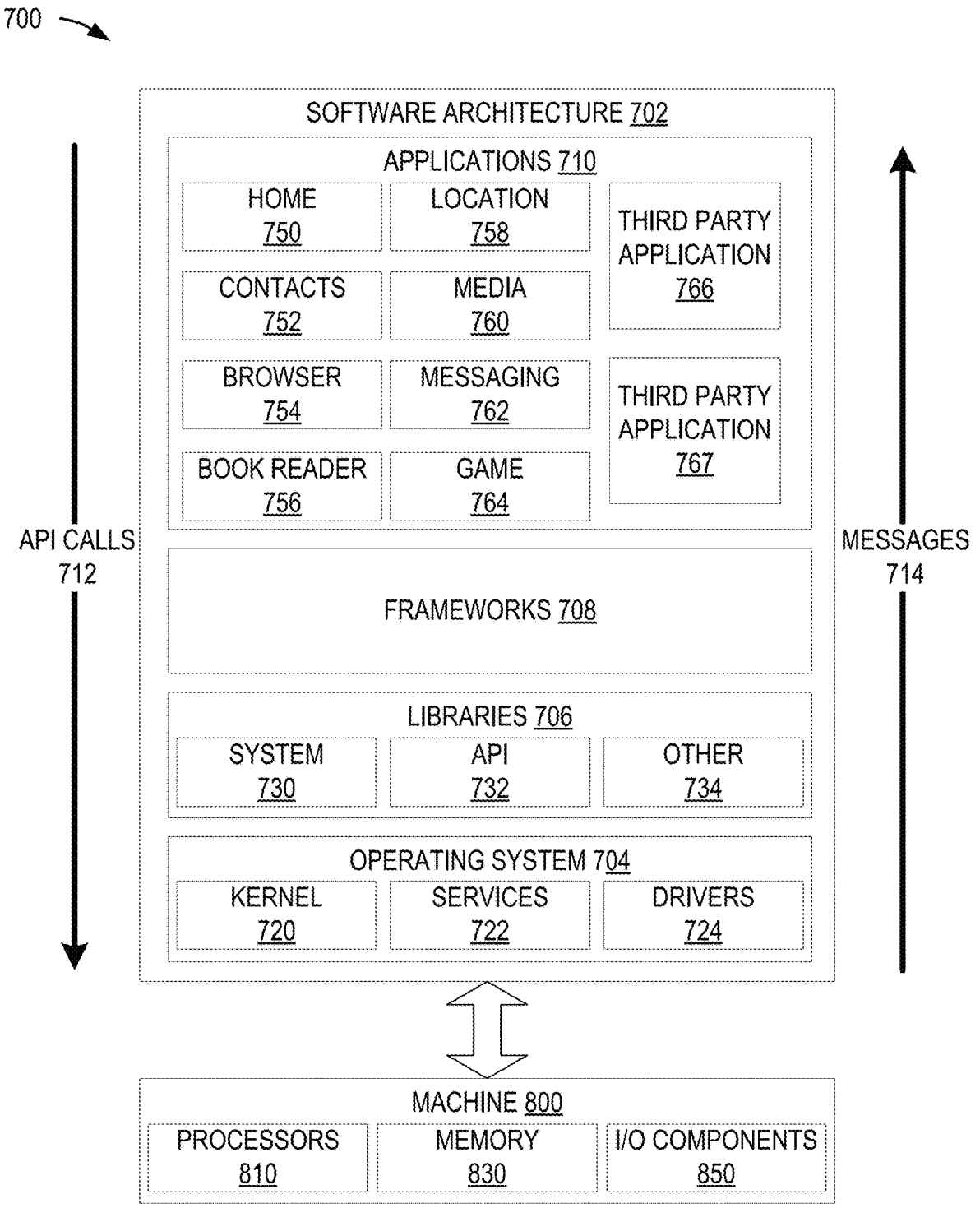
FIG. 7 is a block diagram illustrating an example of a software architecture that may be installed on a machine, according to some examples.

FIG. 7 is a block diagram 700 illustrating software architecture 702, which can be installed on any one or more of the devices described above. For example, in various embodiments, client devices 110 and servers and systems 130, 72, 120, 122, and 124 may be implemented using some or all of the elements of software architecture 702. FIG. 7 is merely a non-limiting example of a software architecture, and it will be appreciated that many other architectures can be implemented to facilitate the functionality described herein. In various embodiments, the software architecture 702 is implemented by hardware such as machine 800 of FIG. 8 that includes processors 810, memory 830, and input/output (I/O) components 850. In this example, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke application programming interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphical user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications such as third-party applications 766 and 767. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Figure 8:
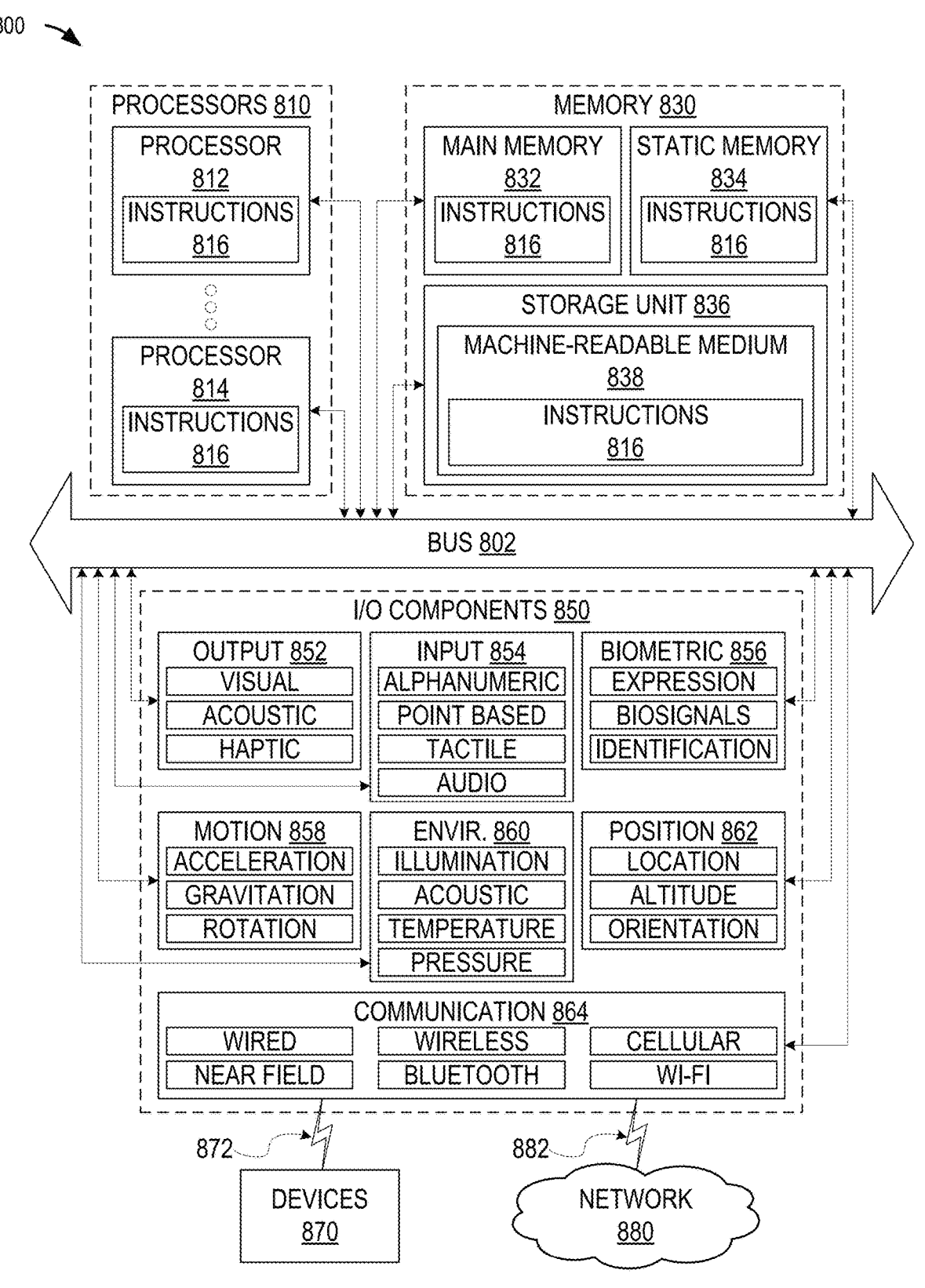
FIG. 8 illustrates a diagrammatic representation of a machine, in the form of a computer system, within which a set of instructions may be executed for causing the machine to perform any one or more of the methodologies discussed herein, according to some examples.

FIG. 8 is a block diagram illustrating components of a machine 800, according to some embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application 710, an applet, an app, or other executable code) for causing the machine 800 to perform any one or more of the methodologies discussed herein can be executed. In alternative embodiments, the machine 800 operates as a standalone device or can be coupled (e.g., networked) to other machines. In a networked deployment, the machine 800 may operate in the capacity of a server machine or system 130, 102, 120, 122, 124, etc., or a client device 110 in a server-client network environment, or as a peer machine in a peer-to-peer (or distributed) network environment. The machine 800 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

In various embodiments, the machine 800 comprises processors 810, memory 830, and I/O components 850, which can be configured to communicate with each other via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 812 and a processor 814 that may execute the instructions 816. The term "processor" is intended to include multi-core processors 810 that may comprise two or more independent processors 812, 814 (also referred to as "cores") that can execute instructions 816 contemporaneously. Although FIG. 8 shows multiple processors 810, the machine 800 may include a single processor 810 with a single core, a single processor 810 with multiple cores (e.g., a multi-core processor 810), multiple processors 812, 814 with a single core, multiple processors 812, 814 with multiples cores, or any combination thereof.

The memory 830 comprises a main memory 832, a static memory 834, and a storage unit 836 accessible to the processors 810 via the bus 802, according to some embodiments. The storage unit 836 can include a machine-readable medium 838 on which are stored the instructions 816 embodying any one or more of the methodologies or functions described herein. The instructions 816 can also reside, completely or at least partially, within the main memory 832, within the static memory 834, within at least one of the processors 810 (e.g., within the processor's cache memory), or any suitable combination thereof, during execution thereof by the machine 800. Accordingly, in various embodiments, the main memory 832, the static memory 834, and the processors 810 are considered machine-readable media 838.

As used herein, the term "memory" refers to a machine-readable medium 838 able to store data temporarily or permanently and may be taken to include, but not be limited to, random-access memory (RAM), read-only memory (ROM), buffer memory, flash memory, and cache memory. While the machine-readable medium 838 is shown, in an example embodiment, to be a single medium, the term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions 816, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 850 include a wide variety of components to receive input, provide output, produce output, transmit information, exchange information, capture measurements, and so on. In general, it will be appreciated that the I/O components 850 can include many other components that are not shown in FIG. 8. The I/O components 850 are grouped according to functionality merely for simplifying the following discussion, and the grouping is in no way limiting. In various example embodiments, the I/O components 850 include output components 852 and input components 854. The output components 852 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 850 include biometric components 856, motion components 858, environmental components 860, or position components 862, among a wide array of other components. For example, the biometric components 856 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 include acceleration sensor components (e.g., accelerometer), gravitation sensor components, rotation sensor components (e.g., gyroscope), and so forth. The environmental components 860 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 862 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 850 may include communication components 864 operable to couple the machine 800 to a network 880 or devices 870 via a coupling 882 and a coupling 872, respectively. For example, the communication components 864 include a network interface component or another suitable device to interface with the network 880. In further examples, communication components 864 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 870 may be another machine 800 or any of a wide variety of peripheral devices (e.g., a peripheral device coupled via a Universal Serial Bus (USB)).

Moreover, in some embodiments, the communication components 864 detect identifiers or include components operable to detect identifiers. For example, the communication components 864 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 864, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 880 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling

882 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 816 are transmitted or received over the network 880 using a transmission medium via a network interface device (e.g., a network interface component included in the communication components 864) and utilizing any one of a number of well-known transfer protocols (e.g., Hypertext Transfer Protocol (HTTP)). Similarly, in other example embodiments, the instructions 816 are transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Furthermore, the machine-readable medium 838 is non-transitory (in other words, not having any transitory signals) in that it does not embody a propagating signal. However, labeling the machine-readable medium 838 "non-transitory" should not be construed to mean that the medium is incapable of movement; the machine-readable medium 838 should be considered as being transportable from one physical location to another. Additionally, since the machine-readable medium 838 is tangible, the machine-readable medium 838 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
generating high-dimensional vector embeddings for sets of data to be stored in each of a respective table of a plurality of tables;
storing the high-dimensional vector embeddings for each set of data of the sets of data in the respective table of the plurality of tables;
storing, for each table, a model type and version corresponding to a model used to generate the high-dimensional vector embeddings stored in each respective table of the plurality of tables;
receiving a query and determining a subset of tables of the plurality of tables that are relevant to the query;
determining a stored model type and version associated with each table of the subset of tables relevant to the query, wherein the stored model type and version comprises at least a first model type and a first version and a second model type and a second version;
generating a first high-dimensional vector embedding for the query using at least the first model type and first version and a second high-dimensional vector embedding for the query using the second model type and second version;
generating a set of similar data based on at least the first high-dimensional vector embedding and the second high-dimensional vector embedding for the query and the high-dimensional vector embeddings for the sets of data stored in the subset of tables; and
generating, in real time or near real time from receipt of the query, a response to the query based on the set of similar data.

2. The computer-implemented method of claim 1, wherein after generating high-dimensional vector embeddings for sets of data to be stored in each of a respective table of the plurality of tables, the method comprises:
generating a vector index for each table of the plurality of tables.

3. The computer-implemented method of claim 2, wherein generating the set of similar data based on at least the first high-dimensional vector embedding and the second high-dimensional vector embedding for the query and the high-dimensional vector embeddings for the sets of data stored in the subset of tables comprises using a function that can compare two vectors for similarity and utilize the vector index to compare the two vectors.

4. The computer-implemented method of claim 1, wherein at least two different model types are used to generate high-dimensional vector embeddings.

5. The computer-implemented method of claim 1, wherein at least two different versions of a model type are used to generate high-dimensional vector embeddings.

6. The computer-implemented method of claim 1, wherein generating high-dimensional vector embeddings for sets of data comprises converting each piece of data of each set of data to a vector space with a given number of dimensions.

7. The computer-implemented method of claim 1, wherein the set of similar data is determined based on at least on a comparison of the first high-dimensional vector embedding of the query and the high-dimensional vector embeddings for the sets of data stored in a first table and a comparison of the second high-dimensional vector embedding of the query and high-dimensional vector embeddings for the sets of data stored in a second table.

8. The computer-implemented method of claim 7, wherein the comparison is made using a function that can compare two vectors for similarity.

9. The computer-implemented method of claim 1, wherein the high-dimensional vector embeddings for a set of data stored in a first table were generated using a first model type and a first version, and further comprising:
re-generating high-dimensional vector embeddings for the set of data stored in the first table using the first model type and a second version;
storing the re-generated high-dimensional vector embeddings in the first table; and
updating, for the first table, the version corresponding to the first model type used to re-generate the high-dimensional vector embeddings for the set of data stored in the first table.

10. The computer-implemented method of claim 9, further comprising:
receiving a second query corresponding to the first table;
determining the first model type and second version associated with the first table;
generating a high-dimensional vector embedding for the second query using the first model type and second version associated with the first table;
determining a second set of similar data in the first table based on the high-dimensional vector embeddings of the second query and the high-dimensional vector embeddings for the sets of data stored in the first table; and
generating a response to the second query based on the second set of similar data.

11. The computer-implemented method of claim 1, wherein data comprises text, an image, audio, or video.

12. A system comprising:
a memory that stores instructions; and
one or more processors configured by the instructions to perform operations comprising:
generating high-dimensional vector embeddings for sets of data to be stored in each of a respective table of a plurality of tables;
storing the high-dimensional vector embeddings for each set of data of the sets of data in the respective table of the plurality of tables;
storing, for each table, a model type and version corresponding to a model used to generate the high-dimensional vector embeddings stored in each respective table of the plurality of tables;

receiving a query and determining a subset of tables of the plurality of tables that are relevant to the query;

determining a stored model type and version associated with each table of the subset of tables relevant to the query, wherein the stored model type and version comprises at least a first model type and a first version and a second model type and a second version;

generating a first high-dimensional vector embedding for the query using at least the first model type and first version and a second high-dimensional vector embedding for the query using the second model type and second version;

generating a set of similar data based on at least the first high-dimensional vector embedding and the second high-dimensional vector embedding for the query and the high-dimensional vector embeddings for the sets of data stored in the subset of tables; and generating, in real time or near real time from receipt of the query, a response to the query based on the set of similar data.

13. The system of claim 12, wherein after generating high-dimensional vector embeddings for sets of data to be stored in each of a respective table of the plurality of tables, the operations comprise:

generating a vector index for each table of the plurality of tables.

14. The system of claim 12, wherein at least two different model types are used to generate high-dimensional vector embeddings or wherein at least two different versions of a model type are used to generate high-dimensional vector embeddings.

15. The system of claim 12, wherein generating high-dimensional vector embeddings for sets of data comprises converting each piece of data of each set of data to a vector space with a given number of dimensions.

16. The system of claim 12, wherein the set of similar data is determined based on at least on a comparison of the first high-dimensional vector embeddings of the query and the high-dimensional vector embeddings for the sets of data stored in a first table and a comparison of the second high-dimensional vector embeddings of the query and vector embeddings for the sets of data stored in a second table.

17. The system of claim 16, wherein the comparison is made using a function that can compare two vectors for similarity.

18. The system of claim 12, wherein the high-dimensional vector embeddings for a set of data stored in a first table were generated using a first model type and a first version, and the operations further comprising:

re-generating high-dimensional vector embeddings for the set of data stored in the first table using the first model type and a second version;

storing the re-generated high-dimensional vector embeddings in the first table; and updating, for the first table, the version corresponding to the first model type used to re-generate the high-dimensional vector embeddings for the set of data stored in the first table.

19. The system of claim 18, the operations further comprising:

receiving a second query corresponding to the first table;

determining the first model type and second version associated with the first table;

generating a high-dimensional vector embedding for the second query using the first model type and second version associated with the first table;

determining a second set of similar data in the first table based on the high-dimensional vector embedding of the second query and the high-dimensional vector embeddings for the sets of data stored in the first table; and generating a response to the second query based on the second set of similar data.

20. A non-transitory computer-readable medium comprising instructions stored thereon that are executable by at least one processor to cause a computing device to perform operations comprising:

generating high-dimensional vector embeddings for sets of data to be stored in each of a respective table of a plurality of tables;

storing the high-dimensional vector embeddings for each set of data of the sets of data in the respective table of the plurality of tables;

storing, for each table, a model type and version corresponding to a model used to generate the high-dimensional vector embeddings stored in each respective table of the plurality of tables;

receiving a query and determining a subset of tables of the plurality of tables that are relevant to the query;

determining a stored model type and version associated with each table of the subset of tables relevant to the query, wherein the stored model type and version comprises at least a first model type and a first version and a second model type and a second version;

generating a first high-dimensional vector embedding for the query using at least the first model type and first version and a second high-dimensional vector embedding for the query using the second model type and second version;

generating a set of similar data based on at least the first high-dimensional vector embedding and the second high-dimensional vector embedding for the query and the high-dimensional vector embeddings for the sets of data stored in the subset of tables; and generating, in real time or near real time from receipt of the query, a response to the query based on the set of similar data.

* * * * *